US012160857B2

(12) United States Patent
Li et al.

(10) Patent No.: US 12,160,857 B2
(45) Date of Patent: Dec. 3, 2024

(54) DYNAMIC MEASUREMENT GAP OPERATION

(71) Applicant: Apple Inc., Cupertino, CA (US)

(72) Inventors: Qiming Li, Beijing (CN); Dawei Zhang, Saratoga, CA (US); Jie Cui, San Jose, CA (US); Yang Tang, San Jose, CA (US); Yushu Zhang, Beijing (CN); Yuqin Chen, Beijing (CN); Huaning Niu, San Jose, CA (US); Manasa Raghavan, Sunnyvale, CA (US); Xiang Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,840

(22) PCT Filed: Jan. 14, 2021

(86) PCT No.: PCT/CN2021/071754
§ 371 (c)(1),
(2) Date: Sep. 24, 2021

(87) PCT Pub. No.: WO2022/151149
PCT Pub. Date: Jul. 21, 2022

(65) Prior Publication Data
US 2023/0345447 A1    Oct. 26, 2023

(51) Int. Cl.
*H04W 72/11*    (2023.01)
*H04W 24/10*    (2009.01)

(52) U.S. Cl.
CPC ............ *H04W 72/11* (2023.01); *H04W 24/10* (2013.01)

(58) Field of Classification Search
CPC ..... H04W 72/11; H04W 24/10; H04W 24/02; H04W 36/0088; H04W 8/24
See application file for complete search history.

(56) References Cited

U.S. PATENT DOCUMENTS 10,342,025 B2 *    7/2019    Wang ................... H04W 72/23
2021/0243839 A1 *   8/2021    Krishnaswamy ..... H04W 24/04
(Continued)

FOREIGN PATENT DOCUMENTS

CN    111713125 A    9/2020
EP    3644523 A1     4/2020
(Continued)

OTHER PUBLICATIONS

Vivo, "Discussion on potential positioning enhancements," 3GPP TSG RAN WG1 #103-e, R1-2007666, Nov. 13, 2020.
(Continued)

*Primary Examiner* — Mounir Moutaouakil
(74) *Attorney, Agent, or Firm* — Blank Rome LLP

(57) ABSTRACT

Aspects herein relate to wireless devices, circuits, and methods for indicating, by a wireless device, to a wireless station, an ability to support semi-persistent (SP) measurement gap (MG) configuration; receiving, from the wireless station, a SP MG configuration; receiving, from the wireless station, a message to activate the SP MG configuration; performing, in response to receiving the message to activate the SP MG configuration, a target carrier frequency measurement, wherein the target carrier frequency measurement is performed in accordance with the activated SP MG configuration; receiving from the wireless station, a message to deactivate the SP MG configuration; and discontinuing, in response to receiving the message to deactivate the SP MG configuration, the performance of the target carrier frequency measurement. In other aspects, the wireless device may indicate, to the wireless station, an ability to support aperiodic (AP) MG configuration, which does not require explicit deactivation by the wireless station.

20 Claims, 10 Drawing Sheets

(56) References Cited

U.S. PATENT DOCUMENTS

| | | | | |
|---|---|---|---|---|
| 2021/0368374 | A1* | 11/2021 | Cheng | H04W 72/542 |
| 2023/0353211 | A1* | 11/2023 | Sun | H04W 24/10 |
| 2023/0361938 | A1* | 11/2023 | He | H04L 1/1832 |
| 2024/0015686 | A1* | 1/2024 | Rao | H04W 64/00 |

FOREIGN PATENT DOCUMENTS

| | | | |
|---|---|---|---|
| WO | 2010037289 | A1 | 4/2010 |
| WO | 2020027601 | A1 | 2/2020 |
| WO | 2020083121 | A1 | 4/2020 |

OTHER PUBLICATIONS

Qualcomm Incorporated: "MR-DC measurement gap pattern capability", 3GPP Draft; 36.331_CR4100 (REL-15)_R2-1911816, 3RD Generation Partnership Project (3GPP), Mobile Competence Centre; 650, Route Des Lucioles; F-06921 Sophia-Antipolis Cedex; FRANCE vol. Ran WG2, No. Prague, Czech Republic; 20190826-20190830 Sep. 12, 2019 (Sep. 12, 2019), XP051778465, Retrieved from the Internet: URL: http://www.3gpp.org/ftp/3guInternal/3GPP_Ultimate_CRPacks/RP-192193.zip [retrieved on Sep. 12, 2019].

Apple et al.: "Motivation paper on Rel-17 further RRM enhancement (FeRRM)", 3GPP Draft; R4-2003406, 3RD Generation Partnership Project (3GPP), Mobile Competence Centre; 650, Route Des Lucioles; F-06921 Sophia-Antipolis Cedex; FRANCE vol. Ran WG4, No. Online; 20200420-20200430 Apr. 10, 2020 (Apr. 10, 2020), XP052406410, Retrieved from the Internet: URL:https://ftp.3gpp.org/tsg_ran/WG4_Radio/TSGR4_94_eBis/Docs/R4-2003406.zip R4-2003406 Motivation paper on Rel-17 further RRM enhancement.pdf.

* cited by examiner

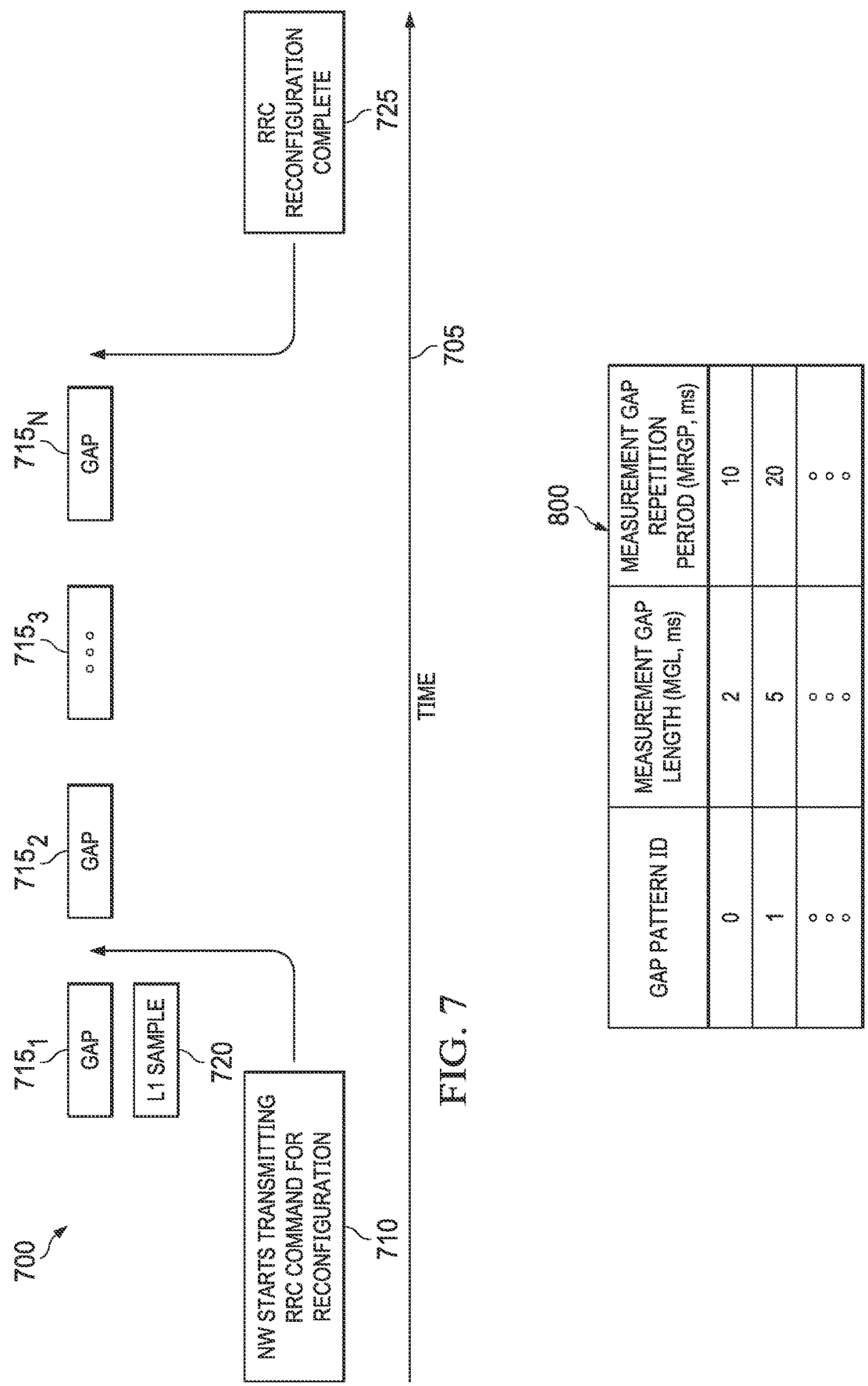

902 ↓

```
┌─────────────────────────────────────────────────────────────┐
│ WHEREIN THE INDICATION OF THE ABILITY TO SUPPORT A SP MG    │
│ CONFIGURATION FURTHER COMPRISES AT LEAST ONE OF THE         │
│ FOLLOWING:                                                  │
│     (A) AN INDICATION OF A PER-USER EQUIPMENT (UE) ABILITY; │
│ 1000 (B) AN INDICATION OF A PER-FREQUENCY RANGE (FR) ABILITY;│
│     (C) AN INDICATION OF A PER-COMPONENT CARRIER (CC) ABILITY;│
│     (D) AN INDICATION OF A PER-BANDWIDTH PART (BWP) ABILITY;│
│     (E) AN INDICATION OF A PER-BAND OR PER-BAND COMBINATION │
│         ABILITY; OR                                         │
│     (F) A COMBINATION OF ANY OF (A)-(E), ABOVE              │
└─────────────────────────────────────────────────────────────┘
                              ↓
┌─────────────────────────────────────────────────────────────┐
│ WHEREIN THE INDICATION OF THE ABILITY TO SUPPORT A SP MG    │
│ CONFIGURATION IS INDICATED TO THE WIRELESS STATION VIA      │
│ AT LEAST ONE OF THE FOLLOWING:                              │
│     (A) AN ENUMERATED VARIABLE INDICATING WHETHER OR NOT    │
│ 1002     SP MG IS SUPPORTED; OR                             │
│     (B) A BIT STRING INDICATING ONE OR MORE MG PATTERNS     │
│         SUPPORTED BY THE WIRELESS DEVICE FOR SP MG          │
│         CONFIGURATIONS                                      │
└─────────────────────────────────────────────────────────────┘
```

```
┌─────────────────────────────────────────────────────────────┐
│ WHEREIN THE SP MG CONFIGURATION RECEIVED FROM THE           │
│ WIRELESS STATION COMPRISES AT LEAST ONE OF THE FOLLOWING:   │
│     (A) A PER-USER EQUIPMENT (UE) CONFIGURATION;            │
│ 1100 (B) A PER-FREQUENCY RANGE (FR) CONFIGURATION;          │
│     (C) A PER-COMPONENT CARRIER (CC) CONFIGURATION;         │
│     (D) A PER-BANDWIDTH PART (BWP) CONFIGURATION;           │
│     (E) A PER-BAND OR PER-BAND COMBINATION CONFIGURATION; OR│
│     (F) A COMBINATION OF ANY OF (A)-(E), ABOVE              │
└─────────────────────────────────────────────────────────────┘
                              ↓
┌─────────────────────────────────────────────────────────────┐
│ WHEREIN THE SP MG CONFIGURATION RECEIVED FROM THE           │
│ WIRELESS STATION FURTHER COMPRISES:                         │
│     A FIRST SP MG CONFIGURATION FOR A FIRST FR, CC, OR BWP; AND│
│     A SECOND SP MG CONFIGURATION FOR A SECOND FR, CC, OR BWP,│
│ 1102     RESPECTIVELY,                                      │
│     WHEREIN THE FIRST SP MG CONFIGURATION AND SECOND SP MG  │
│         CONFIGURATION ARE DIFFERENT                         │
└─────────────────────────────────────────────────────────────┘
```

```
┌─────────────────────────────────────────────────────────────────────────┐
│ WHEREIN THE INDICATION OF THE ABILITY TO SUPPORT AN AP MG               │
│ CONFIGURATION FURTHER COMPRISES AT LEAST ONE OF THE FOLLOWING:          │
│     (A) AN INDICATION OF A PER-USER EQUIPMENT (UE) ABILITY;             │
│     (B) AN INDICATION OF A PER-FREQUENCY RANGE (FR) ABILITY;            │
│ 1300 (C) AN INDICATION OF A PER-COMPONENT CARRIER (CC) ABILITY;         │
│     (D) AN INDICATION OF A PER-BANDWIDTH PART (BWP) ABILITY;            │
│     (E) AN INDICATION OF A PER-BAND OR PER-BAND COMBINATION             │
│        ABILITY; OR                                                      │
│     (F) A COMBINATION OF ANY OF (A)-(E), ABOVE                          │
└─────────────────────────────────────────────────────────────────────────┘
```

1300

```
┌─────────────────────────────────────────────────────────────────────────┐
│ WHEREIN THE INDICATION OF THE ABILITY TO SUPPORT AN AP MG               │
│ CONFIGURATION IS INDICATED TO THE WIRELESS STATION VIA AT LEAST         │
│ ONE OF THE FOLLOWING:                                                   │
│     (A) AN ENUMERATED VARIABLE INDICATING WHETHER OR NOT AP MG IS       │
│ 1302    SUPPORTED; OR                                                   │
│     (B) A BIT STRING INDICATING ONE OR MORE MG PATTERNS SUPPORTED       │
│        BY THE WIRELESS DEVICE FOR SP MG CONFIGURATIONS                  │
└─────────────────────────────────────────────────────────────────────────┘
```

```
┌─────────────────────────────────────────────────────────────────────────┐
│ WHEREIN THE AP MG CONFIGURATION RECEIVED FROM THE                       │
│ WIRELESS STATION COMPRISES AT LEAST ONE OF THE FOLLOWING:               │
│     (A) A PER-USER EQUIPMENT (UE) CONFIGURATION;                        │
│ 1400 (B) A PER-FREQUENCY RANGE (FR) CONFIGURATION;                      │
│     (C) A PER-COMPONENT CARRIER (CC) CONFIGURATION;                     │
│     (D) A PER-BANDWIDTH PART (BWP) CONFIGURATION;                       │
│     (E) A PER-BAND OR PER-BAND COMBINATION CONFIGURATION; OR            │
│     (F) A COMBINATION OF ANY OF (A)-(E), ABOVE                          │
└─────────────────────────────────────────────────────────────────────────┘
```

```
┌─────────────────────────────────────────────────────────────────────────┐
│ WHEREIN THE AP MG CONFIGURATION RECEIVED FROM THE WIRELESS              │
│ STATION FURTHER COMPRISES:                                              │
│     A FIRST AP MG CONFIGURATION FOR A FIRST FR, CC, OR BWP; AND         │
│     A SECOND AP MG CONFIGURATION FOR A SECOND FR, CC, OR BWP,           │
│ 1402    RESPECTIVELY,                                                   │
│     WHEREIN THE FIRST AP MG CONFIGURATION AND SECOND AP MG              │
│        CONFIGURATION ARE DIFFERENT                                      │
└─────────────────────────────────────────────────────────────────────────┘
```

1702 — WHEREIN THE INDICATION COMPRISES AN INDICATION OF AN ABILITY TO SUPPORT AN SP MG CONFIGURATION, AND WHEREIN THE PROCESSOR IS FURTHER CONFIGURED TO: TRANSMIT, TO THE WIRELESS DEVICE, A MESSAGE TO DEACTIVATE THE SP MG CONFIGURATION

1802 — WHEREIN THE INDICATION COMPRISES AN INDICATION OF AN ABILITY TO SUPPORT AN AP MG CONFIGURATION, AND WHEREIN THE MESSAGE TO ACTIVATE THE MG CONFIGURATION COMPRISES AT LEAST ONE OF:
(A) AN INDICATION OF A NUMBER OF MG OCCASIONS THAT WILL BE ENABLED; OR
(B) AN INDICATION OF AN AMOUNT OF TIME DURING WHICH MG OCCASIONS WILL BE ENABLED

FIG. 18

DYNAMIC MEASUREMENT GAP OPERATION

FIELD

The present application relates to wireless devices and wireless networks, including devices, circuits, and methods for dynamic measurement gap (MG) operation.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) New Radio (NR) communication. Accordingly, improvements in the field in support of such development and design are desired.

SUMMARY

Aspects disclosed herein relate to wireless devices, circuits, and methods for indicating, by a wireless device, to a wireless station, an ability to support semi-persistent (SP) measurement gap (MG) configuration; receiving, from the wireless station, a SP MG configuration; receiving, from the wireless station, a message to activate the SP MG configuration; performing, in response to receiving the message to activate the SP MG configuration, a target carrier frequency measurement, wherein the target carrier frequency measurement is performed in accordance with the activated SP MG configuration; receiving from the wireless station, a message to deactivate the SP MG configuration; and discontinuing, in response to receiving the message to deactivate the SP MG configuration, the performance of the target carrier frequency measurement.

Further aspects disclosed herein relate to wireless devices, circuits, and methods for indicating, by a wireless device, to a wireless station, an ability to support aperiodic (AP) measurement gap configuration; receiving, from the wireless station, an AP MG configuration; receiving, from the wireless station, a message to activate the AP MG configuration; and performing, in response to receiving the message to activate the AP MG configuration, a target carrier frequency measurement, wherein the target carrier frequency measurement is performed in accordance with the activated AP MG configuration.

Yet further aspects disclosed herein relate to wireless devices, circuits, and methods for receiving, at a wireless station, from a wireless device, an indication of an ability to support semi-persistent or aperiodic measurement gap configuration; transmitting, to the wireless device, a MG configuration; transmitting, to the wireless device, a message to activate the MG configuration; and receiving, in response to transmitting the message to activate the MG configuration, a target carrier frequency measurement, wherein the target carrier frequency measurement was performed by the wireless device in accordance with the activated MG configuration.

The techniques described herein may be implemented in and/or used with a number of different types of devices, including but not limited to cellular phones, wireless devices, wireless base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings:

FIG. 7 illustrates a measurement gap configuration scheme, according to some aspects.

FIG. 8 illustrates a table of exemplary gap patterns that could be defined for SP and/or AP use, according to some aspects.

FIGS. 9-11 are flowcharts detailing methods of semi-persistent MG configuration for a wireless device, according to some aspects.

FIGS. 12-15 are flowcharts detailing methods of aperiodic MG configuration for a wireless device, according to some aspects.

FIGS. 16-18 are flowcharts detailing methods of aperiodic and semi-persistent MG configuration for a wireless station, according to some aspects.

Figure 1:
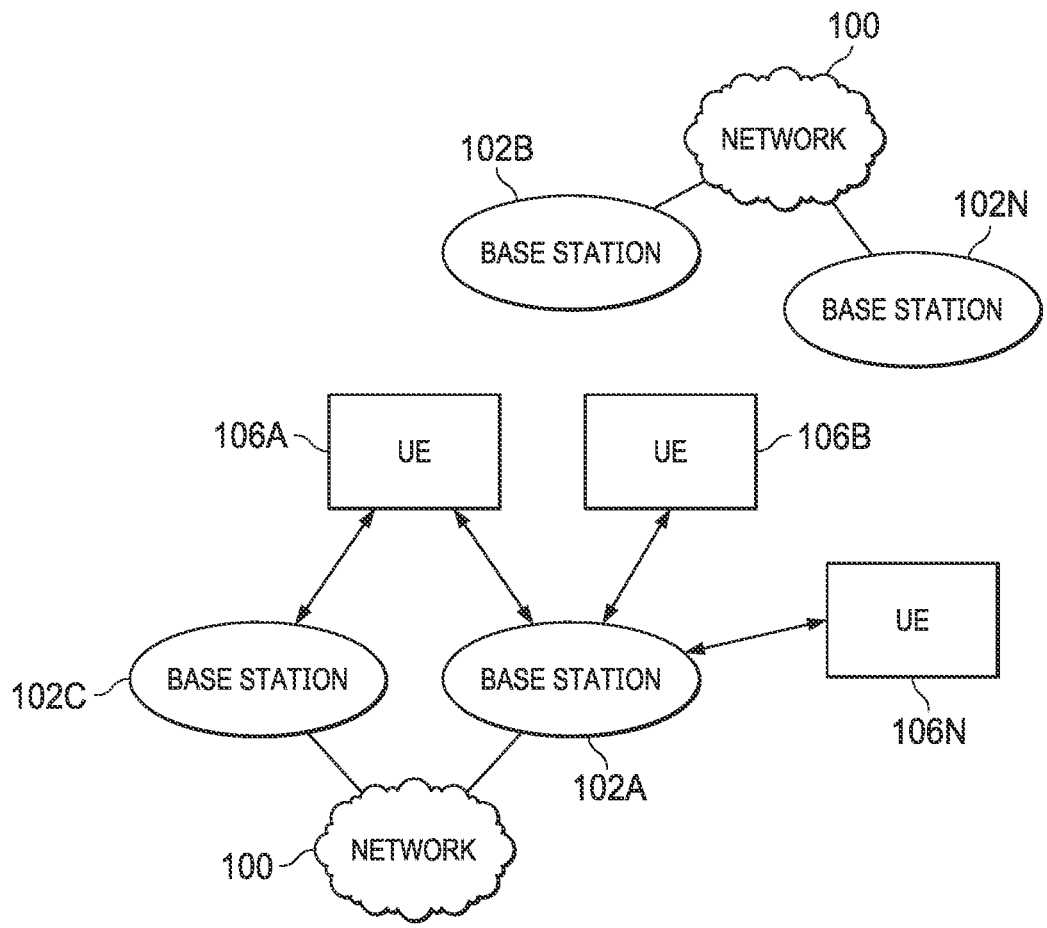
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

As defined in 3GPP Releases 15 and 16, in most cases, Layer 1 (L1) measurement times are faster than Layer 3 (L3) measurement times (which may have delays of 200 ms or more), especially when the timeRestrictionForChannelMeasurement parameter is configured, such that the UE has to report a measurement result based on a "one shot," i.e., single, measurement. Further, L1 measurement is more flexible than L3 measurement, since NR supports aperiodic (AP) and semi-persistent (SP) L1 measurements.

In some designs, gap-based L1 measurement on neighboring cells is also possible. For instance, if a Channel State Information Reference Signal (CSI-RS) in a target cell is out of a UE's active bandwidth part (BWP) in its current serving cell, or if the numerology of the target CSI-RS is different from that of the UE's active BWP, the UE may need a measurement gap period in which to conduct such L1 measurements on the neighbor cell. However, according to the 3GPP Release 15/16 specifications, all measurement gap patterns are periodic, and they may only be configured or reconfigured by Radio Resource Control (RRC) commands, which may have delays of 150 ms or more, when including the RRC transmission and processing.

Under the existing framework, even though L1 measurement can be much faster and can be aperiodic and semi-persistent, the network still needs to configure periodic measurement gaps for the UE. As will be described in greater detail herein, the efficiency of measurement gap configuration and network throughput can be improved by adopting dynamic measurement gap configuration schemes.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices). FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™. Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the terms "UE" or "UE device" or "user device" can be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The terms "base station," "wireless base station," or "wireless station" have the full breadth of their ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node." or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form but not be involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 56 new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
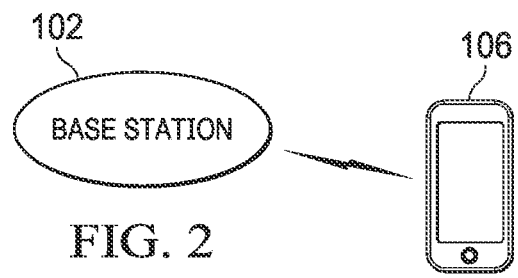
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DO) and the channel condition. There can be four or more different PDCCH formats defined in LTE with different numbers of CCEs (e.g., aggregation level, L=1, 2, 4, or 8).

Example Communication Device

Figure 3:
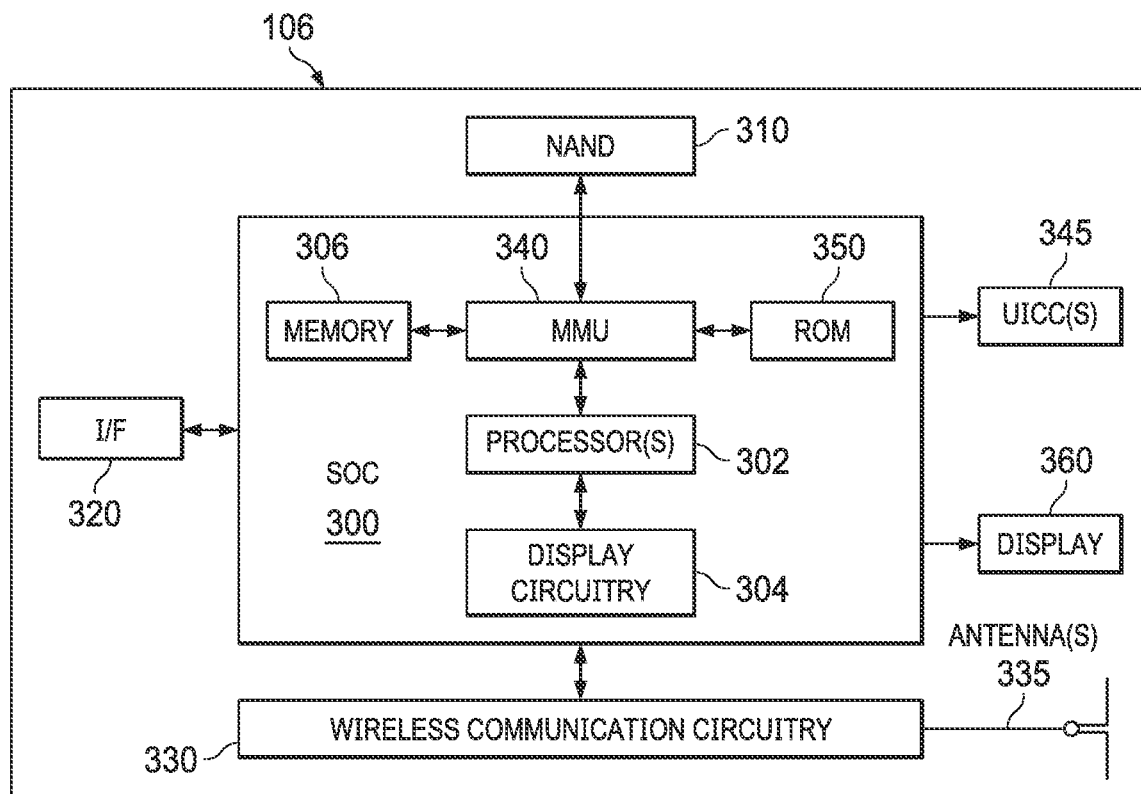
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
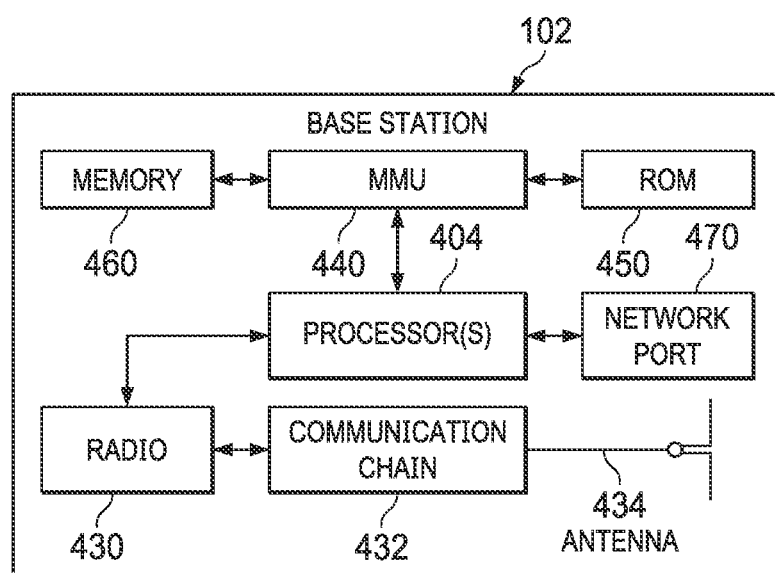
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station. e.g., a 5G New Radio (50 NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 50 NR radio for performing communication according to 50 NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA20 (10, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
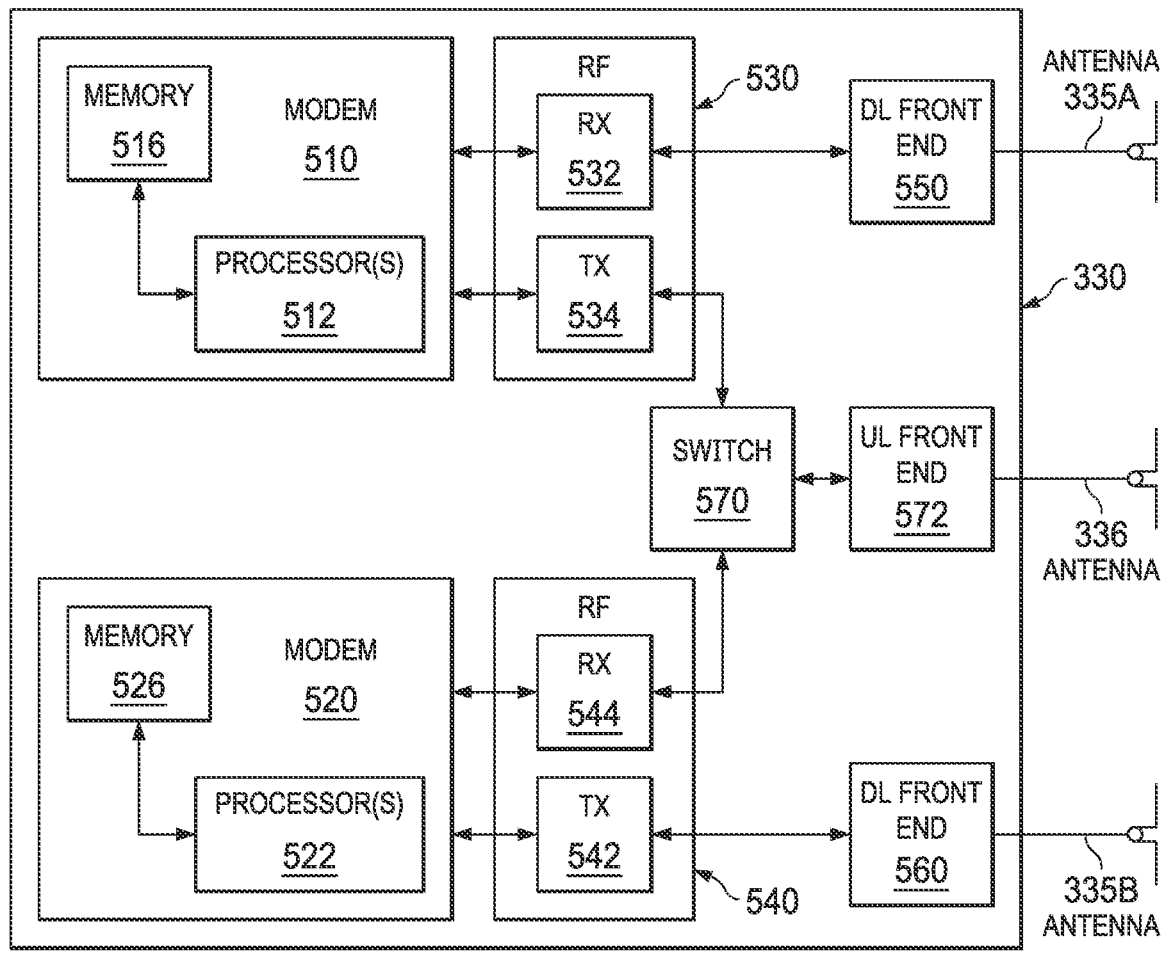
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
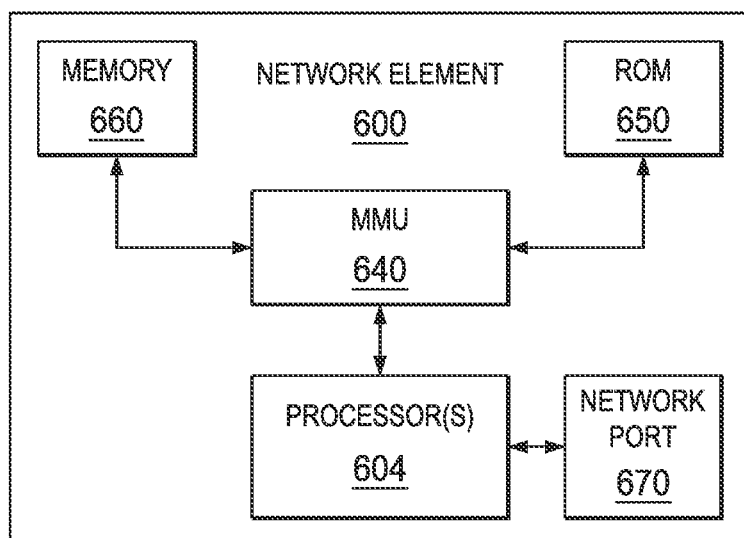
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Exemplary Dynamic Measurement Gap Operation Schemes

Turning now to FIG. 7, an exemplary scheme 700 for measurement gap configuration is illustrated, according to some aspects. In the illustrated scheme 700, time runs across the horizontal axis 705. During measurement gap time periods 715, the UE may make retune its Radio Frequency (RF) and make measurements on neighboring cells. For example, as illustrated in FIG. 7, during measurement gap $715_1$, the UE may take an L1 sample measurement 720.

Next, at block 710, a hypothetical reconfiguration process may be initiated by the network (NW), e.g., via a gNB, transmitting an RRC commend for reconfiguration to the UE. It may be assumed that only a few L1 samples are needed for measurement by the UE. However, the network still needs to provide measurement gap configuration for the UE, e.g., according to existing measurement gap pattern configuration, such as those defined in Technical Specification 38.133 at Table 9.1.2-1: Gap Pattern Configuration.

After the reference signal measurement is done, the network may choose to cancel the measurement gap operation. The RRC reconfiguration procedure typically take several hundreds of milliseconds to complete, e.g., ending at block 725. Therefore, it is possible that several measurement gaps (e.g., $715_2$, $715_3$ ... $715_N$) would be wasted before the RRC reconfiguration is complete, which will result in overall system throughput degradation. In other words, in the example of FIG. 7, only a "one shot" measurement 720 is needed, which means only the measurement gap $715_1$ is necessary. The other measurement gaps (e.g., $715_2$, $715_3$ ... $715_N$) are, in a sense, redundant, due to the inefficient network reconfiguration.

Semi-persistent (SP) Measurement Gap (MG) Configuration

According to a first aspect, this problem of inefficient network reconfiguration may be addressed by introducing a new semi-persistent (SP) measurement gap (MG) configuration. As described in further detail below with reference to FIGS. 9-11, according to some designs, a UE may first indicate its support of semi-persistent measurement gap in a UE capability report. The support of semi-persistent gap configuration can be defined: as an indication of a per-user equipment (UE) ability; an indication of a per-frequency range (FR) ability; an indication of a per-component carrier (CC) ability; an indication of a per-bandwidth part (BWP) ability; an indication of a per-band or per-band combination ability (e.g., the UE could indicate a first capability for support only in bands 1 and 2, or a second capability for support only in bands 3 and 4, and so forth); or a combination of any of the above.

Support for such a SP MG configuration may be indicated to the wireless station via at least one of the following: (a) an enumerated variable (e.g., a variable 'supported' having value a value of either '0' or '1') indicating whether or not SP MG is supported; or (b) a bit string indicating one or more MG patterns supported by the wireless device for SP MG configurations. According to some such aspects, the mapping between the new bit string and the measurement gap pattern(s) optionally supported by the UE for semi-persistent use could be same as supportedGapPattern (as defined in Release-15) or supporiedGapPaitern-r16 (as defined in Release-16). Alternately, as described in greater detail below with respect to FIGS. 8, a new series of measurement gap patterns, defined specifically for semi-persistent MG use, could be defined.

Once the UE has indicated its support of semi-persistent measurement gap, the network may preconfigure the SP measurement gaps for the UE via RRC configuration/reconfiguration. After such configuration, the measurement gap may remain in a so-called "deactivated" mode, i.e., with no active measurement gap being employed, until it is explicitly activated. As will be described in greater detail below, e.g., with respect to FIG. 11, the network can possibly configure different measurement pattern(s) for different FR, CC, and/or BWPs for the same UE, depending on how the MGs are configured.

Once the measurement gap is needed by the UE, the network may activate the SP MG via an activation command, which could be based on the use of MAC-CE or DCI. If, as mentioned above, the measurement gap is configured per-FR, -CC and/or -BWP, the measurement gap activation command may explicitly indicate which set of measurement gaps is to be activated. For instance, if the semi-persistent measurement gap configuration is configured per FR, the network may configure different gap patterns for FR1 and FR2, respectively. In such cases, the network may indicate in the activation command that it is for semi-persistent measurement gap in FR1, or in FR2, or even both.

Finally, once the measurement gap is no longer needed by the UE, the network may deactivate the SP MG via a deactivation command, which could be based on the use of MAC-CE or DCI messages, or even based on a timer that begins running at activation and triggers the disabling of the measurement gap configuration upon the expiration of the timer. As mentioned above, if the semi-persistent measurement gap configuration is configured per FR, for example, the network may indicate in the deactivation command that it is for the deactivation of semi-persistent measurement gap in FR1, or in FR2, or both.

Aperiodic (AP) Measurement Gap (MG) Configuration

According to a second aspect, the problem of inefficient network reconfiguration may be addressed by introducing a new aperiodic (AP) measurement gap (MG) configuration. As described in further detail below with reference to FIGS. 12-15, according to some designs, a UE may first indicate its support of aperiodic measurement gap in a UE capability report. As with SP MG configurations described above, the support of aperiodic gap configuration can be defined: as an indication of a per-user equipment (UE) ability: an indication of a per-frequency range (FR) ability; an indication of a per-component carrier (CC) ability; an indication of a per-bandwidth part (BWP) ability: an indication of a per-band or per-band combination ability (e.g., the UE could indicate a first capability for support only in bands 1 and 2, and a second capability for support only in bands 3 and 4, and so forth): or a combination of any of the above.

Support for such an AP MG configuration may be indicated to the wireless station via at least one of the following: (a) an enumerated variable (e.g., a variable 'supported' having value a value of either '0' or '1') indicating whether or not AP MG is supported; or (b) a bit string indicating one or more MG patterns supported by the wireless device for AP MG configurations. According to some such aspects, the mapping between the new bit string and the measurement gap pattern(s) optionally supported by the UE for AP use could be same as supportedGapPattern (as defined in Release-15) or supportedGapPattern-r16 (as defined in Release-16). Alternately, as described in greater detail below with respect to FIGS. 8, a new series of measurement gap patterns, defined specifically for AP MG use, could be defined.

Once the UE has indicated its support of AP measurement gap, the network may preconfigure the AP measurement gaps for the UE via RRC configuration/reconfiguration. After such configuration, the measurement gap may remain in a so-called "deactivated" mode, i.e., with no active measurement gap being employed, until it is explicitly activated. As will be described in greater detail below, e.g., with respect to FIG. 14, the network can possibly configure different measurement pattern(s) for different FR. CC, and/or BWPs for the same UE, depending on how the MGs are configured.

Once the measurement gap is needed by the UE, the network may activate the AP MG via an activation command, which could be based on the use of MAC-CE or DCI. If, as mentioned above, the measurement gap is configured per-FR. -CC and/or -BWP, the measurement gap activation command may explicitly indicate which set of measurement gaps is to be activated. For instance, if the AP measurement gap configuration is configured per FR, the network may configure different gap patterns for FR1 and FR2, respectively. In such cases, the network may indicate in the activation command that it is for AP measurement gap in FR1, or in FR2, or even both.

According to some designs, in the activation command the network can indicate how many measurement gaps will be enabled. According to a first option, a single activation command may correspond x measurement gap occasions (where. e.g., x=1, 3, 5, . . . ). For example, in some instances, one DCI message may indicate that only a single measurement gap occasion will be enabled (i.e., without repetition). According to a second option, a new timer may be introduced to control the duration of the aperiodic measurement gap. For example, after the initial activation command, the timer may begin decrementing. The measurement gap may then be enabled while the timer is running and, after the timer expires, the measurement gap shall be disabled.

Exemplary Newly-Defined Measurement Gap Patterns

Turning now to FIG. 8, a table of exemplary gap patterns 800 that could be defined for SP and/or AP use is illustrated (e.g., if different values than those presently defined in Table 9.1.2-1 are desired), according to some aspects. Similar to Table 9.1.2-1, the first column in table 800 illustrates new exemplary gap pattern IDs; the middle column illustrates new exemplary measurement gap lengths (MGLs, in ms); and the right column illustrates new exemplary measurement gap repetition periods (MGRPs, in ms). It is to be understood that patterns in table 800 are merely exemplary, and that any desired combinations of MGL and MGRP could be employed in a system, as is desired.

Figure 9:
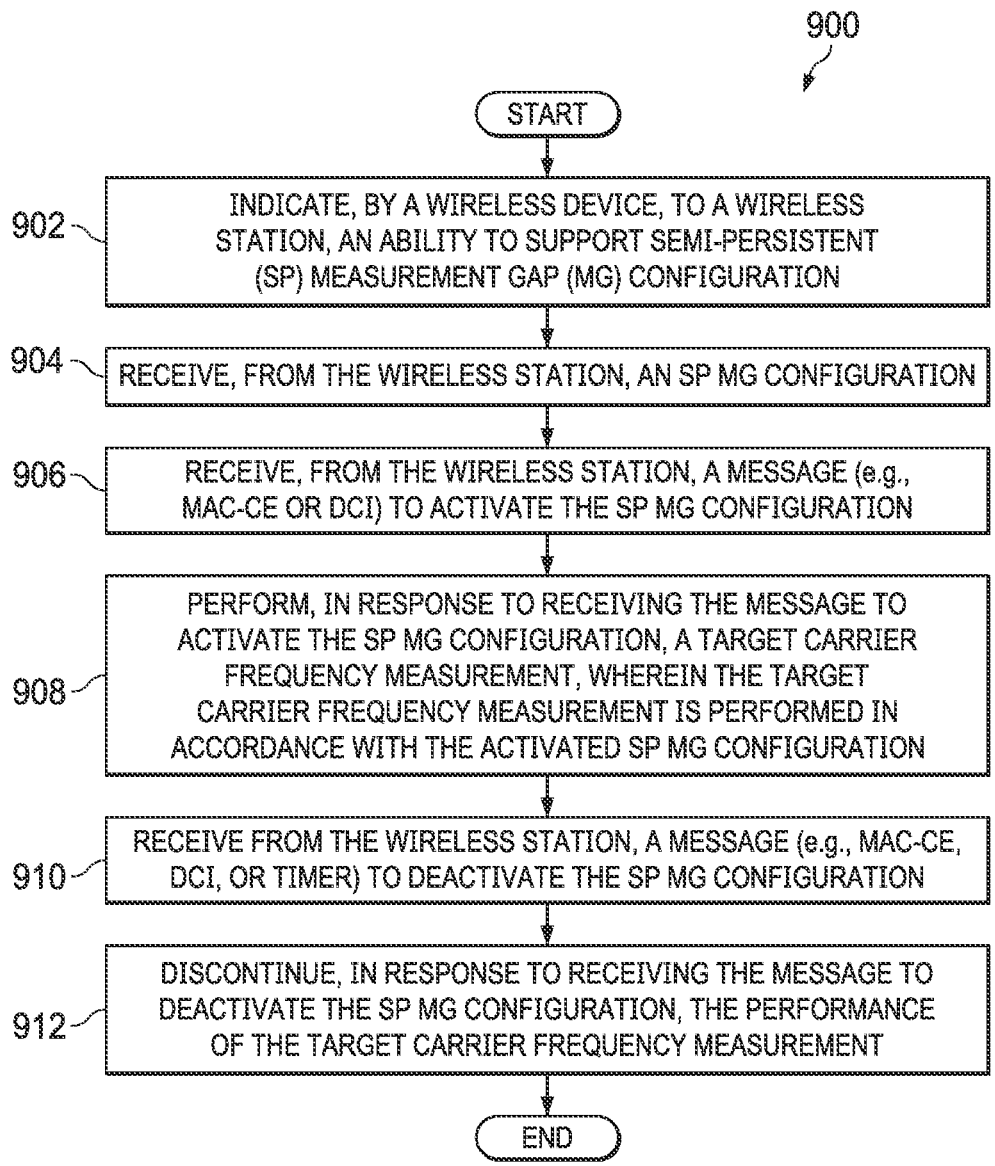

Exemplary Methods for Semi-Persistent and Aperiodic MG Configuration for Wireless Devices Turning first to FIG. 9, a flowchart 900 is shown, detailing a method of semi-persistent (SP) MG configuration for a wireless device, according to some aspects. Method 900 may begin by indicating, by a wireless device, to a wireless station, an ability to support semi-persistent (SP) measurement gap (MG) configuration (Step 902). Next, at Step 904, the method 900 may proceed by receiving, at the wireless device, from the wireless station, a SP MG configuration. Next, at Step 906, the method 900 may proceed by receiving, at the wireless device, from the wireless station, a message (e.g., a MAC-CE or DCI message) to activate the SP MG configuration. Next, at Step 908, the method 900 may proceed by performing, at the wireless device, in response to receiving the message to activate the SP MG configuration, a target carrier frequency measurement (e.g., the measurement of one or more characteristics of one or more reference signals on a target carrier), wherein the target carrier frequency measurement is performed in accordance with the activated SP MG configuration. Next, at Step 910, the method 900 may proceed by receiving, at the wireless device, from the wireless station, a message (e.g., a MAC-CE or DC1 message, or timer information) to deactivate the SP MG configuration. Finally, at Step 912, the method 900 may conclude by discontinuing, at the wireless device, in response to receiving the message to deactivate the SP MG configuration, the performance of the target carrier frequency measurement.

Turning to FIG. 10, a flowchart is shown, illustrating additional details for Step 902 of FIG. 9. First, at Step 1000, the indication of the ability to support a SP MG configuration at Step 902 further comprises at least one of the following: (a) an indication of a per-user equipment (UE) ability: (b) an indication of a per-frequency range (FR) ability; (c) an indication of a per-component carrier (CC) ability: (d) an indication of a per-bandwidth part (BWP) ability; (e) an indication of a per-band or per-band combination ability; or (l) a combination of any of (a)-(e), above. Next, at Step 1002, the indication of the ability to support a SP MG configuration at Step 902 is indicated to the wireless station via at least one of the following: (a) an enumerated variable indicating whether or not SP MG is supported; or (b) a bit string indicating one or more MG patterns supported by the wireless device for SP MG configurations.

Turning to FIG. 11, a flowchart is shown, illustrating additional details for Step 904 of FIG. 9. First, at Step 1100, the SP MG configuration received from the wireless station at Step 904 comprises at least one of the following: (a) a per-user equipment (UE) configuration: (b) a per-frequency range (FR) configuration; (c) a per-component carrier (CC) configuration: (d) a per-bandwidth part (BWP) configuration; (e) a per-band or per-band combination configuration: or (f) a combination of any of (a)-(e), above. Next, at Step 1102, the SP MG configuration received from the wireless station at Step 904 further comprises: a first SP MG configuration for a first FR, CC, or BWP; and a second SP MG configuration for a second FR, CC, or BWP, respectively, wherein the first SP MG configuration and second SP MG configuration are different. For example, the wireless device may receive a first SP MG configuration for FR1 and a second, different, SP MG configuration for FR2. Similarly, the wireless device may receive a first SP MG configuration for a first BWP, BWP 1, and a second, different, SP MG configuration for second BWP, BWP2.

Figure 12:
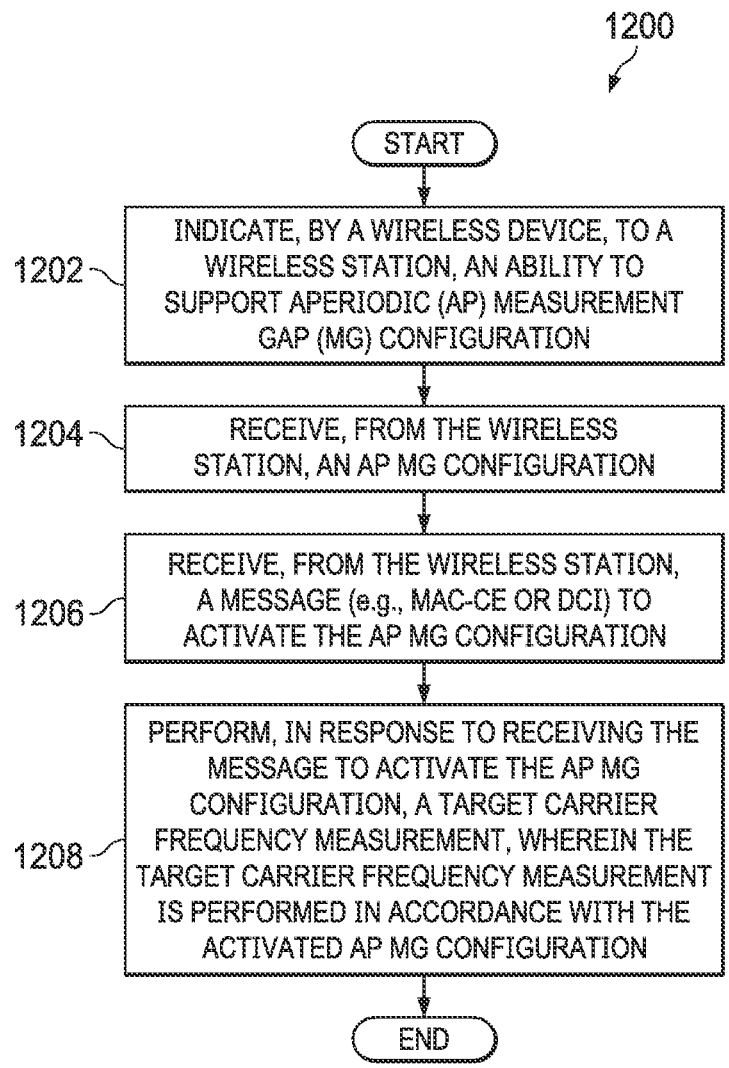

Turning now to FIG. 12, a flowchart 1200 is shown, detailing a method of aperiodic (AP) MG configuration for a wireless device, according to some aspects. Method 1200 may begin by indicating, by a wireless device, to a wireless station, an ability to support aperiodic AP MG configuration (Step 1202). Next, at Step 1204, the method 1200 may proceed by receiving, at the wireless device, from the wireless station, an AP MG configuration. Next, at Step 1206, the method 1200 may proceed by receiving, at the wireless device, from the wireless station, a message (e.g., MAC-CE or DCI message) to activate the AP MG configuration. Next, at Step 1208, the method 1200 may proceed by performing, at the wireless device, in response to receiving the message to activate the AP MG configuration, a target carrier frequency measurement, wherein the target carrier frequency measurement is performed in accordance with the activated AP MG configuration.

Turning to FIG. 13, a flowchart is shown, illustrating additional details for Step 1202 of FIG. 12. First, at Step 1300, the indication of the ability to support an AP MG configuration at Step 1202 further comprises at least one of the following: (a) an indication of a per-user equipment (UE) ability; (b) an indication of a per-frequency range (FR) ability; (c) an indication of a per-component carrier (CC) ability; (d) an indication of a per-bandwidth part (BWP) ability: (e) an indication of a per-band or per-band combination ability; or (f) a combination of any of (a)-(e), above. Next, at Step 1302, the indication of the ability to support an AP MG configuration at Step 1202 is indicated to the wireless station via at least one of the following: (a) an enumerated variable indicating whether or not AP MG is supported; or (b) a bit string indicating one or more MG patterns supported by the wireless device for AP MG configurations.

Turning to FIG. 14, a flowchart is shown, illustrating additional details for Step 1204 of FIG. 12. First, at Step 1400, the AP MG configuration received from the wireless station at Step 1204 comprises at least one of the following: (a) a per-user equipment (UE) configuration; (b) a per-frequency range (FR) configuration; (c) a per-component carrier (CC) configuration; (d) a per-bandwidth part (BWP) configuration: (e) a per-band or per-band combination configuration; or (1) a combination of any of (a)-(e), above. Next, at Step 1402, the AP MG configuration received from the wireless station at Step 1204 further comprises: a first AP MG configuration for a first FR, CC, or BWP; and a second AP MG configuration for a second FR, CC, or BWP, respectively, wherein the first AP MG configuration and second AP MG configuration are different.

Figure 15:
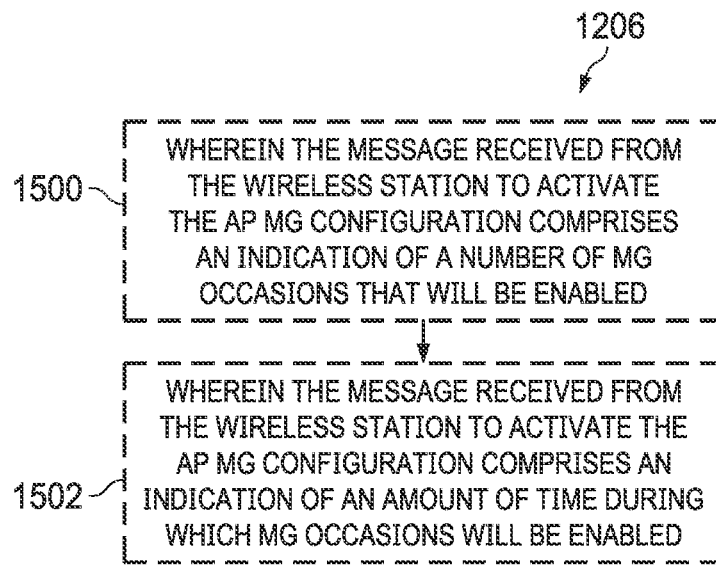

Turning to FIG. 15, a flowchart is shown, illustrating additional details for Step 1206 of FIG. 12. First, at Step 1500, the message received from the wireless station to activate the AP MG configuration at Step 1206 may optionally comprise an indication of a number of MG occasions that will be enabled. Next, at Step 1502, the message received from the wireless station to activate the AP MG configuration at Step 1206 may optionally comprise an indication of an amount of time during which MG occasions will be enabled, e.g., via the use of a countdown timer.

Figure 16:
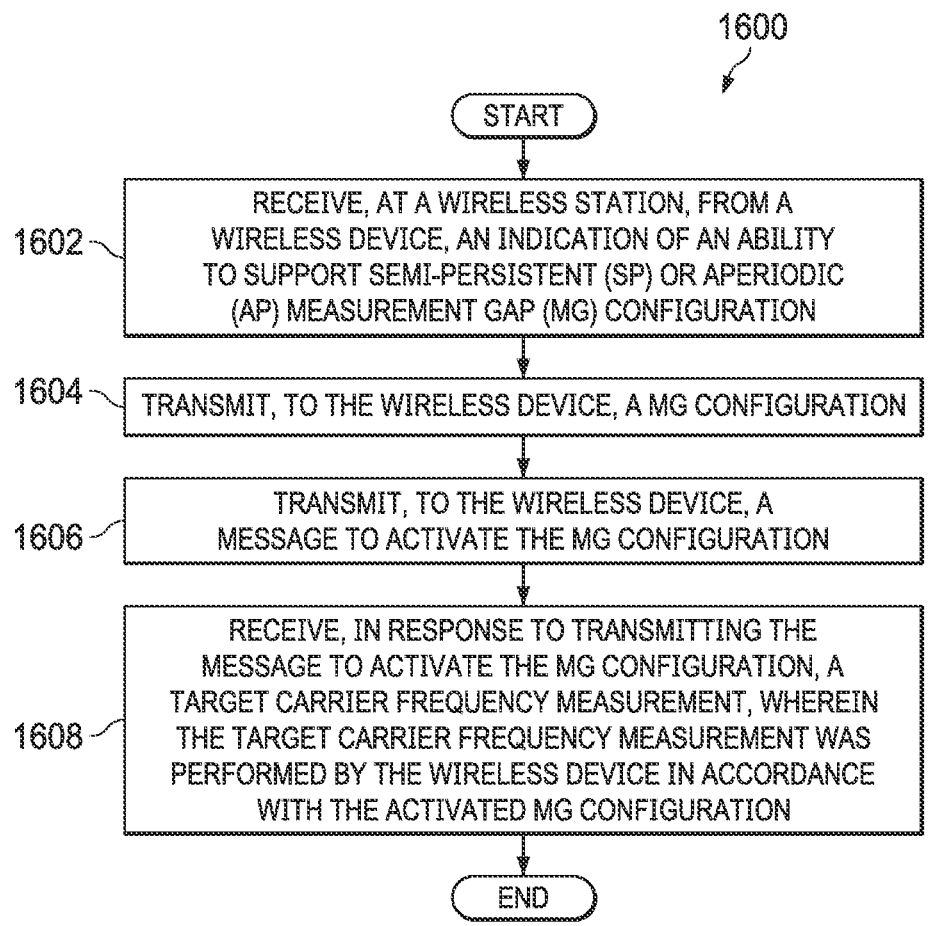

Exemplary Methods for Semi-Persistent and Aperiodic MG Configuration for Wireless Stations Turning now to FIG. 16, a flowchart 1600 is shown, detailing methods of aperiodic and semi-persistent MG configuration for a wireless station, according to some aspects. Method 1600 may begin by receiving, at a wireless station, from a wireless device, an indication of an ability to support semi-persistent (SP) or aperiodic (AP) measurement gap (MG) configuration (Step 1602). Next, at Step 1604, the method 1600 may proceed by transmitting, from the wireless station, to the wireless device, a MG configuration. Next, at Step 1604, the method 1600 may proceed by transmitting, from the wireless station, to the wireless device, a message to activate the MG configuration. Finally, at Step 1608, the method 1600 may conclude by receiving, at the wireless station, in response to transmitting the message to activate the MG configuration, a target carrier frequency measurement, wherein the target carrier frequency measurement was performed by the wireless device in accordance with the activated MG configuration.

Turning to FIG. 17, a flowchart 1700 is shown, illustrating additional options for the method 1600 of FIG. 16. At Step 1702, the indication at Step 1602 may comprise an indication of an ability to specifically support an SP MG configuration, wherein the method 1600 then further comprises transmitting, from the wireless station, to the wireless device, a message to deactivate the SP MG configuration.

Turning to FIG. 18, a flowchart 1800 is shown, illustrating additional options for the method 1600 of FIG. 16. At Step 1802, the indication at Step 1602 may comprise an indication of an ability to specifically support an AP MG configuration, wherein the message to activate the MG configuration at Step 1606 further comprises at least one of: (a) an indication of a number of MG occasions that will be enabled; or (b) an indication of an amount of time during which MG occasions will be enabled, e.g., via the use of a countdown timer.

It is noted that the dashed line boxes in FIGS. 9-18 in this application indicate the optionality of such steps or features. Further, one or more optional steps or features may be combined with each other in any desired fashion.

Examples

In the following sections, further exemplary aspects are provided.

According to example 1, a wireless device is disclosed, comprising: a radio; and a processor operably coupled to the radio, wherein the processor is configured to: indicate, to a wireless station, an ability to support semi-persistent (SP) measurement gap (MG) configuration; receive, from the wireless station, a SP MG configuration; receive, from the wireless station, a message to activate the SP MG configuration; perform, in response to receiving the message to activate the SP MG configuration, a target carrier frequency measurement, wherein the target carrier frequency measurement is performed in accordance with the activated SP MG configuration; receive from the wireless station, a message to deactivate the SP MG configuration; and discontinue, in response to receiving the message to deactivate the SP MG configuration, the performance of the target carrier frequency measurement.

Example 2 comprises the subject matter of example 1, wherein the indication of the ability to support a SP MG configuration further comprises at least one of the following: (a) an indication of a per-user equipment (UE) ability; (b) an indication of a per-frequency range (FR) ability; (c) an indication of a per-component carrier (CC) ability; (d) an indication of a per-bandwidth part (BWP) ability; (e) an indication of a per-band or per-band combination ability; or (f) a combination of any of (a)-(e), above.

Example 3 comprises the subject matter of example 1, wherein the indication of the ability to support a SP MG configuration is indicated to the wireless station via at least one of the following: (a) an enumerated variable indicating whether or not SP MG is supported; or (b) a bit string indicating one or more MG patterns supported by the wireless device for SP MG configurations.

Example 4 comprises the subject matter of example 3, wherein the one or more MG patterns indicated by the bit string comprise MG patterns defined differently than those defined in supportedGapPattern (as defined in Release-15) or supportedGapPattern-r16 (as defined in Release-16).

Example 5 comprises the subject matter of example 1, wherein the SP MG configuration received from the wireless station comprises at least one of the following: (a) a per-user equipment (UE) configuration; (b) a per-frequency range (FR) configuration; (c) a per-component carrier (CC) configuration; (d) a per-bandwidth part (BWP) configuration; (e) a per-band or per-band combination configuration; or (1) a combination of any of (a)-(e), above.

Example 6 comprises the subject matter of example 5, wherein the SP MG configuration received from the wireless station further comprises: a first SP MG configuration for a first FR, CC, or BWP; and a second SP MG configuration for a second FR, CC, or BWP, respectively, wherein the first SP MG configuration and second SP MG configuration are different.

Example 7 comprises the subject matter of example 1, wherein the message received from the wireless station to activate the SP MG configuration comprises at least one of the following: (a) a Medium Access Control (MAC) Control Element (CE) message; or (b) a Downlink Control Information (DCI) message.

Example 8 comprises the subject matter of example 1, wherein the message received from the wireless station to deactivate the SP MG configuration comprises at least one of the following: (a) a Medium Access Control (MAC) Control Element (CE) message; (b) a Downlink Control Information (DCI) message; or (c) an indication of an amount of time after which MG occasions will be disabled.

According to example 9, a wireless device is disclosed, comprising: a radio; and a processor operably coupled to the radio, wherein the processor is configured to: indicate, to a wireless station, an ability to support aperiodic (AP) measurement gap (MG) configuration; receive, from the wireless station, an AP MG configuration; receive, from the wireless station, a message to activate the AP MG configuration; and perform, in response to receiving the message to activate the AP MG configuration, a target carrier frequency measurement, wherein the target carrier frequency measurement is performed in accordance with the activated AP MG configuration.

Example 10 comprises the subject matter of example 9, wherein the indication of the ability to support an AP MG configuration further comprises at least one of the following: (a) an indication of a per-user equipment (UE) ability; (b) an indication of a per-frequency range (FR) ability; (c) an indication of a per-component carrier (CC) ability; (d) an indication of a per-bandwidth part (BWP) ability; (e) an indication of a per-band or per-band combination ability: or (f) a combination of any of (a)-(e), above.

Example 11 comprises the subject matter of example 9, wherein the indication of the ability to support an AP MG configuration is indicated to the wireless station via at least one of the following: (a) an enumerated variable indicating whether or not AP MG is supported; or (b) a bit string indicating one or more MG patterns supported by the wireless device for AP MG configurations.

Example 12 comprises the subject matter of example 11, wherein the one or more MG patterns indicated by the bit string comprise MG patterns defined differently than those defined in supportedGapPattern (as defined in Release-15) or supportedGapPattern-r16 (as defined in Release-16).

Example 13 comprises the subject matter of example 9, wherein the AP MG configuration received from the wireless station comprises at least one of the following: (a) a per-user equipment (UE) configuration; (b) a per-frequency range (FR) configuration; (c) a per-component carrier (CC) configuration; (d) a per-bandwidth part (BWP) configuration; (e) a per-band or per-band combination configuration; or (f) a combination of any of (a)-(e), above.

Example 14 comprises the subject matter of example 13, wherein the AP MG configuration received from the wireless station further comprises: a first AP MG configuration for a first FR, CC, or BWP; and a second AP MG configuration for a second FR, CC, or BWP, respectively, wherein the first AP MG configuration and second AP MG configuration are different.

Example 15 comprises the subject matter of example 9, wherein the message received from the wireless station to activate the AP MG configuration comprises at least one of the following: (a) a Medium Access Control (MAC) Control Element (CE) message; or (b) a Downlink Control Information (DO) message.

Example 16 comprises the subject matter of example 9, wherein the message received from the wireless station to activate the AP MG configuration comprises an indication of a number of MG occasions that will be enabled.

Example 17 comprises the subject matter of example 9, wherein the message received from the wireless station to activate the AP MG configuration comprises an indication of an amount of time during which MG occasions will be enabled.

According to example 18, a wireless station is disclosed, comprising: a radio: and a processor operably coupled to the radio, wherein the processor is configured to: receive, from a wireless device, an indication of an ability to support semi-persistent (SP) or aperiodic (AP) measurement gap (MG) configuration; transmit, to the wireless device, a MG configuration; transmit, to the wireless device, a message to activate the MG configuration: and receive, in response to transmitting the message to activate the MG configuration, a target carrier frequency measurement, wherein the target carrier frequency measurement was performed by the wireless device in accordance with the activated MG configuration.

Example 19 comprises the subject matter of example 18, wherein the indication comprises an indication of an ability to support an SP MG configuration, and wherein the processor is further configured to: transmit, to the wireless device, a message to deactivate the SP MG configuration.

Example 20 comprises the subject matter of example 18, wherein the indication comprises an indication of an ability to support an AP MG configuration, and wherein the message to activate the MG configuration comprises at least one of: an indication of a number of MG occasions that will be enabled: or an indication of an amount of time during which MG occasions will be enabled.

Yet another exemplary aspect may include a method, comprising, by a device, performing any or all parts of the preceding examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding examples.

Yet another exemplary aspect may include an apparatus comprising means for performing any or all of the elements of any of the preceding examples.

Still another exemplary aspect may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method. e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device comprising:
a radio; and
a processor operably coupled to the radio,
wherein the processor is configured to:
indicate, to a wireless station, a user equipment (UE) capability report comprising an ability to support semi-persistent (SP) measurement gap (MG) configuration, wherein the ability to support the SP MG configuration further comprises: an indication of a per-user equipment (UE) ability, and an indication of a per-frequency range (FR) ability indicated in a bit string indicating one or more MG patterns supported by the wireless device for SP MG configurations;
receive, from the wireless station, a SP MG configuration;
receive, from the wireless station, a message to activate the SP MG configuration;
perform, in response to receiving the message to activate the SP MG configuration, a target carrier frequency measurement, wherein the target carrier frequency measurement is performed in accordance with the activated SP MG configuration;
receive from the wireless station, a message to deactivate the SP MG configuration; and
discontinue, in response to receiving the message to deactivate the SP MG configuration, the performance of the target carrier frequency measurement.

2. The wireless device of claim 1, wherein the indication of the ability to support a SP MG configuration further comprises at least one of the following:
an indication of a per-component carrier (CC) ability;
an indication of a per-bandwidth part (BWP) ability; or
an indication of a per-band or per-band combination ability.

3. The wireless device of claim 1, wherein the indication of the ability to support a SP MG configuration is further indicated to the wireless station via at least one of the following:
an enumerated variable indicating whether or not SP MG is supported.

4. The wireless device of claim 1, wherein the one or more MG patterns indicated by the bit string comprise MG patterns defined differently than those defined in supportedGapPattern (as defined in Release-15) or supportedGapPattern-r16 (as defined in Release-16).

5. The wireless device of claim 1, wherein the SP MG configuration received from the wireless station comprises at least one of the following:
(a) a per-user equipment (UE) configuration;
(b) a per-frequency range (FR) configuration;
(c) a per-component carrier (CC) configuration;
(d) a per-bandwidth part (BWP) configuration;
(e) a per-band or per-band combination configuration; or
(f) a combination of any of (a)-(e), above.

6. The wireless device of claim 5, wherein the SP MG configuration received from the wireless station further comprises:
a first SP MG configuration for a first FR, CC, or BWP; and
a second SP MG configuration for a second FR, CC, or BWP, respectively,
wherein the first SP MG configuration and second SP MG configuration are different.

7. The wireless device of claim 1, wherein the message received from the wireless station to activate the SP MG configuration comprises at least one of the following:
(a) a Medium Access Control (MAC) Control Element (CE) message; or
(b) a Downlink Control Information (DCI) message.

8. The wireless device of claim 1, wherein the message received from the wireless station to deactivate the SP MG configuration comprises at least one of the following:
(a) a Medium Access Control (MAC) Control Element (CE) message;
(b) a Downlink Control Information (DCI) message; or
(c) an indication of an amount of time after which MG occasions will be disabled.

9. A wireless device comprising:
a radio; and
a processor operably coupled to the radio,
wherein the processor is configured to:
indicate, to a wireless station, a UE capability report comprising an ability to support aperiodic (AP) measurement gap (MG) configuration, wherein the ability to support the AP MG configuration further comprises: an indication of a per-user equipment (UE) ability, and an indication of a per-frequency range (FR) ability indicated in a bit string indicating one or more MG patterns supported by the wireless device;
receive, from the wireless station, an AP MG configuration;
receive, from the wireless station, a message to activate the AP MG configuration; and
perform, in response to receiving the message to activate the AP MG configuration, a target carrier frequency measurement, wherein the target carrier frequency measurement is performed in accordance with the activated AP MG configuration.

10. The wireless device of claim 9, wherein the indication of the ability to support an AP MG configuration further comprises at least one of the following:
an indication of a per-component carrier (CC) ability;
an indication of a per-bandwidth part (BWP) ability; or
an indication of a per-band or per-band combination ability.

11. The wireless device of claim 9, wherein the indication of the ability to support an AP MG configuration is further indicated to the wireless station via at least one of the following:
(a) an enumerated variable indicating whether or not AP MG is supported.

12. The wireless device of claim 9, wherein the one or more MG patterns indicated by the bit string comprise MG patterns defined differently than those defined in supportedGapPattern (as defined in Release-15) or supportedGapPattern-r16 (as defined in Release-16).

13. The wireless device of claim 9, wherein the AP MG configuration received from the wireless station comprises at least one of the following:
(a) a per-user equipment (UE) configuration;
(b) a per-frequency range (FR) configuration;
(c) a per-component carrier (CC) configuration;
(d) a per-bandwidth part (BWP) configuration;
(e) a per-band or per-band combination configuration; or
(f) a combination of any of (a)-(e), above.

14. The wireless device of claim 13, wherein the AP MG configuration received from the wireless station further comprises:
a first AP MG configuration for a first FR, CC, or BWP; and
a second AP MG configuration for a second FR, CC, or BWP, respectively, wherein the first AP MG configuration and second AP MG configuration are different.

15. The wireless device of claim 9, wherein the message received from the wireless station to activate the AP MG configuration comprises at least one of the following:
(a) a Medium Access Control (MAC) Control Element (CE) message; or
(b) a Downlink Control Information (DCI) message.

16. The wireless device of claim 9, wherein the message received from the wireless station to activate the AP MG configuration comprises an indication of a number of MG occasions that will be enabled.

17. The wireless device of claim 9, wherein the message received from the wireless station to activate the AP MG configuration comprises an indication of an amount of time during which MG occasions will be enabled.

18. A wireless station, comprising:
a radio; and
a processor operably coupled to the radio,
wherein the processor is configured to:
receive, from a wireless device, a UE capability comprising an indication of an ability to support semi-persistent (SP) or aperiodic (AP) measurement gap (MG) configuration, wherein the ability to support the AP MG configuration further comprises: an indication of a per-user equipment (UE) ability, and an indication of a per-frequency range (FR) ability indicated in a bit string indicating one or more MG patterns supported by the wireless device;
transmit, to the wireless device, a MG configuration;
transmit, to the wireless device, a message to activate the MG configuration; and
receive, in response to transmitting the message to activate the MG configuration, a target carrier frequency measurement, wherein the target carrier frequency measurement was performed by the wireless device in accordance with the activated MG configuration.

19. The wireless station of claim 18, wherein the indication comprises an indication of an ability to support an SP MG configuration, and wherein the processor is further configured to:
transmit, to the wireless device, a message to deactivate the SP MG configuration.

20. The wireless station of claim 18, wherein the indication comprises an indication of an ability to support an AP MG configuration, and wherein the message to activate the MG configuration comprises at least one of:
(a) an indication of a number of MG occasions that will be enabled; or
(b) an indication of an amount of time during which MG occasions will be enabled.

* * * * *

UNITED STATES PATENT AND TRADEMARK OFFICE
CERTIFICATE OF CORRECTION

| | | |
|---|---|---|
| PATENT NO. | : 12,160,857 B2 | Page 1 of 1 |
| APPLICATION NO. | : 17/593840 | |
| DATED | : December 3, 2024 | |
| INVENTOR(S) | : Qiming Li et al. | |

It is certified that error appears in the above-identified patent and that said Letters Patent is hereby corrected as shown below:

In the Claims

Claim 11, Column 26, Line 43: delete the phrase "at least one of" after -- via --

Signed and Sealed this
Seventh Day of January, 2025

Derrick Brent
*Acting Director of the United States Patent and Trademark Office*